United States Patent
Kamiguchi et al.

(10) Patent No.: US 8,989,525 B2
(45) Date of Patent: Mar. 24, 2015

(54) LIGHT DEFLECTING ELEMENT

(71) Applicants: Yuuzo Kamiguchi, Kanagawa (JP);
Katsuya Sugawara, Kanagawa (JP);
Masahiro Kanamaru, Kanagawa (JP);
Keiichiro Yusu, Kanagawa (JP);
Masatoshi Sakurai, Tokyo (JP)

(72) Inventors: Yuuzo Kamiguchi, Kanagawa (JP);
Katsuya Sugawara, Kanagawa (JP);
Masahiro Kanamaru, Kanagawa (JP);
Keiichiro Yusu, Kanagawa (JP);
Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 170 days.

(21) Appl. No.: 13/726,953

(22) Filed: Dec. 26, 2012

(65) Prior Publication Data
US 2013/0259417 A1 Oct. 3, 2013

(30) Foreign Application Priority Data
Mar. 27, 2012 (JP) .................. 2012-071478

(51) Int. Cl.
*G02F 1/295* (2006.01)
*G02F 1/29* (2006.01)

(52) U.S. Cl.
CPC ................ *G02F 1/29* (2013.01); *G02F 1/2955* (2013.01)
USPC .................................... 385/8; 385/4; 359/245

(58) Field of Classification Search
None
See application file for complete search history.

(56) References Cited

U.S. PATENT DOCUMENTS

| 5,802,223 | A * | 9/1998 | Nashimoto | 385/8 |
| 8,620,117 | B2 * | 12/2013 | Nakagawa et al. | 385/3 |
| 2002/0114556 | A1 * | 8/2002 | Kato et al. | 385/16 |
| 2005/0123228 | A1 * | 6/2005 | Nishizawa et al. | 385/4 |
| 2009/0015904 | A1 * | 1/2009 | Okayama | 359/315 |

FOREIGN PATENT DOCUMENTS

| JP | 09-005797 | 1/1997 |
| JP | 10-186419 | 7/1998 |

(Continued)

OTHER PUBLICATIONS

Notice of Rejection issued by the Japanese Patent Office on Apr. 30, 2014, for Japanese Patent Application No. 2012-071478, and English-language translation thereof.

(Continued)

*Primary Examiner* — Hemang Sanghavi
(74) *Attorney, Agent, or Firm* — Finnegan, Henderson, Farabow, Garrett & Dunner, L.L.P.

(57) ABSTRACT

According to an embodiment, a light deflecting element includes a dielectric body, a first electrode, and a second electrode. The second electrode is configured to sandwich the dielectric body with the first electrode so as to apply a voltage to the dielectric body. The second electrode includes orthogonal portions that are substantially orthogonal to an incident direction of a light beam passing through the dielectric body, parallel portions that are substantially parallel to the incident direction of the light beam. The orthogonal portions and the parallel portions are formed in an alternate manner on the light beam incident side of the dielectric body. The second electrode includes a linear sloping portion that slopes in a direction toward intersection with the incident direction of the light beam. The orthogonal portions, the parallel portions, and the linear sloping portion are formed integrally.

4 Claims, 6 Drawing Sheets

(56) References Cited

FOREIGN PATENT DOCUMENTS

| | | |
|---|---|---|
| JP | 10-239718 | 9/1998 |
| JP | 10288798 A * | 10/1998 |
| JP | 2003-098559 | 4/2003 |
| JP | 2013-191250 | 9/2013 |
| JP | 2013-206491 | 10/2013 |
| JP | 2013-206520 | 10/2013 |
| JP | 2013-206521 | 10/2013 |

OTHER PUBLICATIONS

U.S. Appl. No. 13/537,755, filed Jun. 29, 2012, entitled "Optical Disc and Recording and Reproducing Apparatus and Method", 68 pages.

* cited by examiner

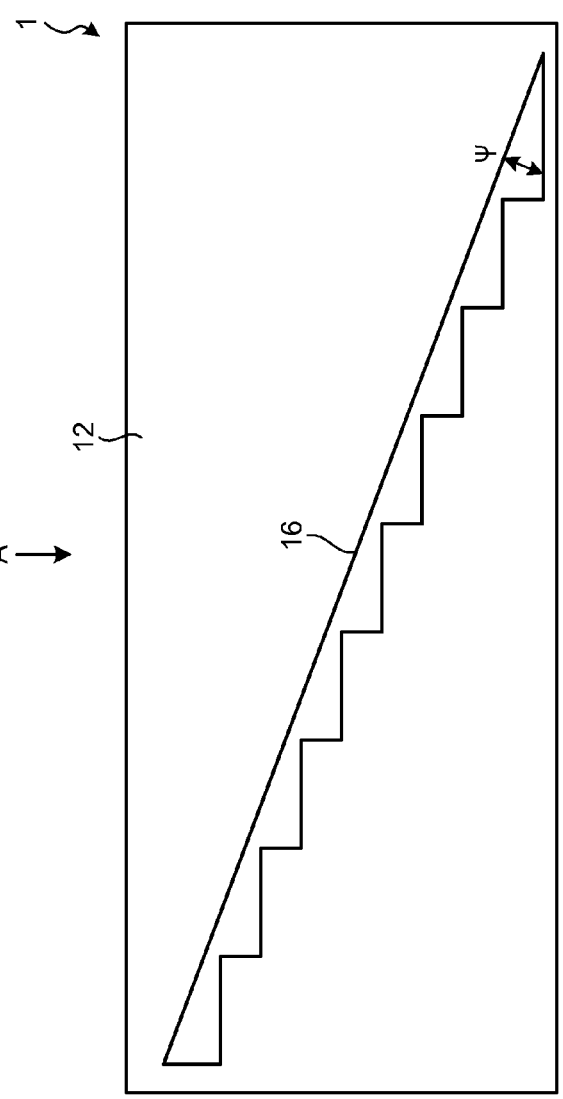
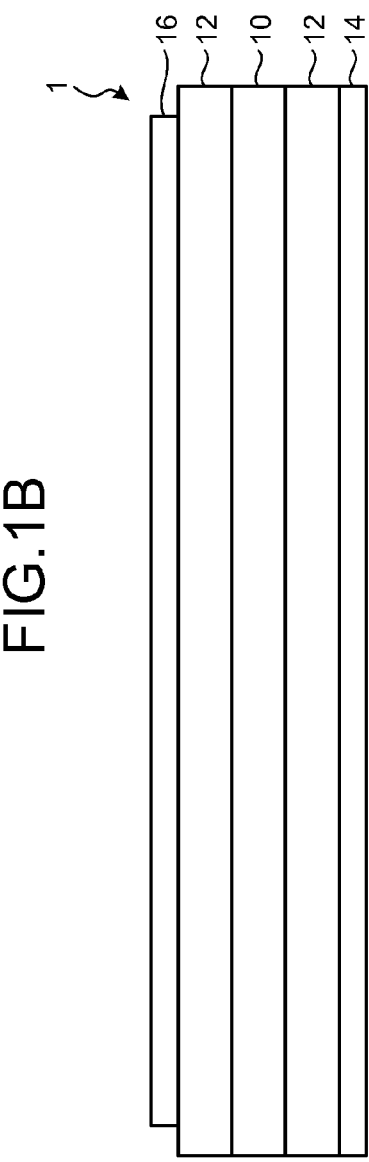

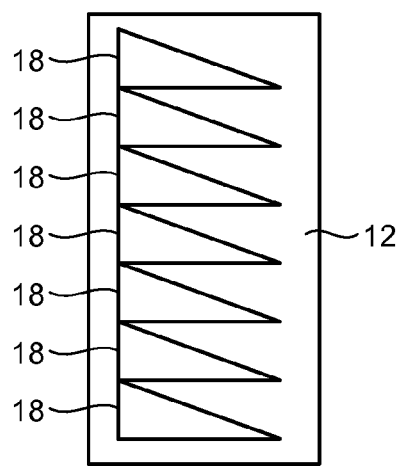
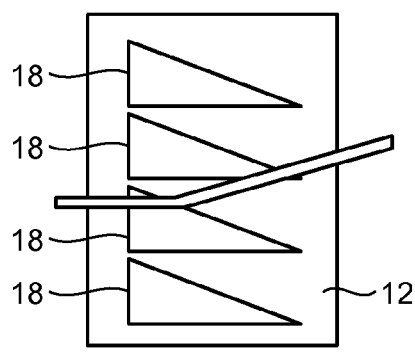 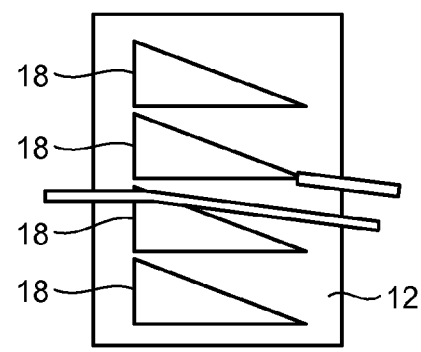

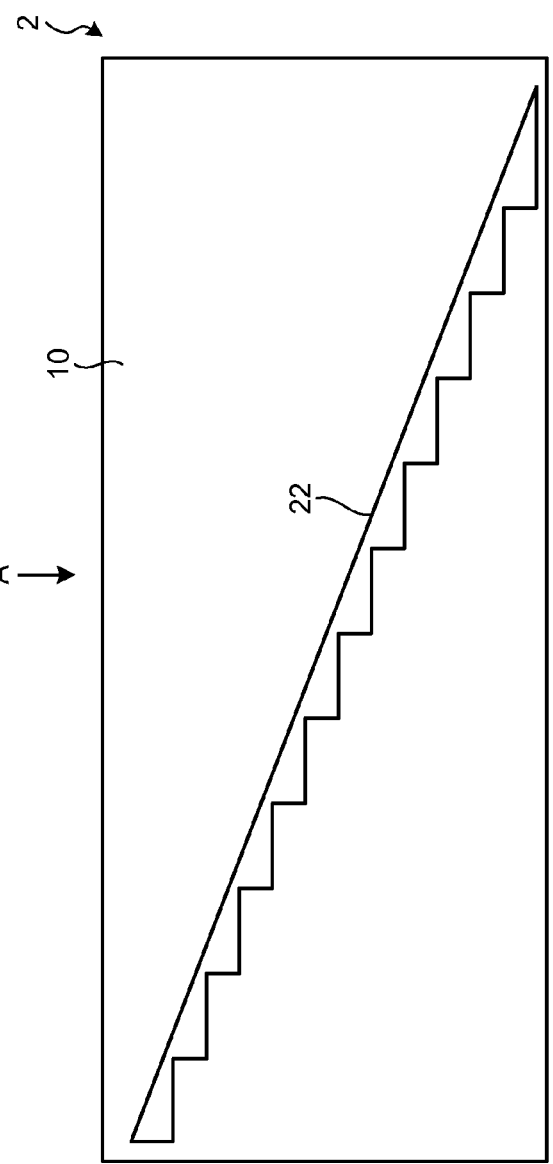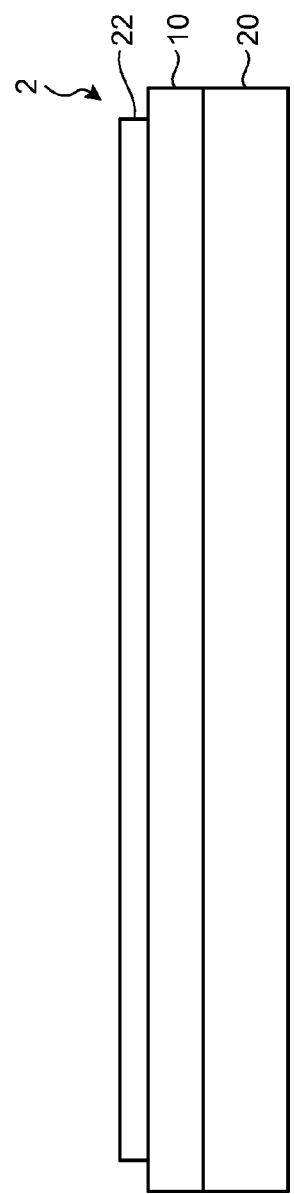

LIGHT DEFLECTING ELEMENT

CROSS-REFERENCE TO RELATED APPLICATIONS

This application is based upon and claims the benefit of priority from Japanese Patent Application No. 2012-071478, filed on Mar. 27, 2012; the entire contents of which are incorporated herein by reference.

FIELD

Embodiments described herein relate generally to a light deflecting element.

BACKGROUND

It is a known fact that a light deflecting element is formed with the use of a material having an electro-optic effect, so that the incident light can be deflected and output without having to use a mechanically movable member.

However, with conventional technology, it is not possible to deflect a gathered light such as an optical spot at high speed.

BRIEF DESCRIPTION OF THE DRAWINGS

FIGS. 1A and 1B are diagrams illustrating a general outline of a light deflecting element according to a first embodiment;

FIG. 3 is a configuration diagram illustrating a general outline of a light deflecting element according to a comparison example with respect to the light deflecting element according to the first embodiment;

FIGS. 4A and 4B are schematic diagrams that schematically illustrate the function of deflecting laser beams that is implemented by the light deflecting element according to the comparison example;

FIGS. 5A and 5B are diagrams illustrating a general outline of a light deflecting element according to a second embodiment;

DETAILED DESCRIPTION

Figure 2A:
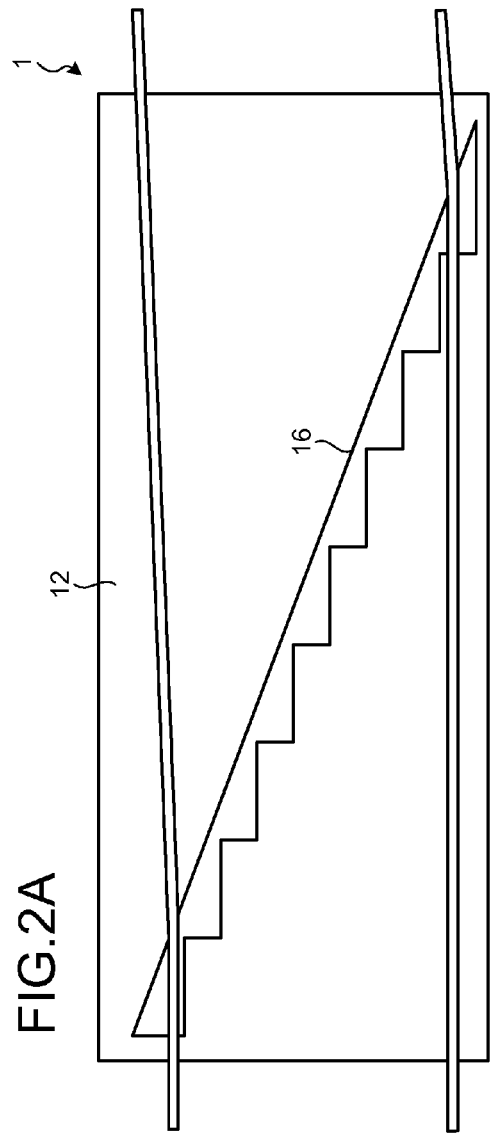
FIGS. 2A and 2B are schematic diagrams that schematically illustrate the function of deflecting laser beams that is implemented by the light deflecting element according to the first embodiment.

According to an embodiment, a light deflecting element includes a dielectric body, a first electrode, and a second electrode. The dielectric body has a first surface and a second surface facing each other, and an electro-optic effect. The first electrode is disposed on the first surface. The second electrode is configured to sandwich the dielectric body with the first electrode so as to apply a voltage to the dielectric body. The second electrode is disposed on the second surface. The second electrode includes a plurality of orthogonal portions that are substantially orthogonal to an incident direction of a light beam passing through the dielectric body, a plurality of parallel portions that are substantially parallel to the incident direction of the light beam. The orthogonal portions and the parallel portions are formed in an alternate manner on the light beam incident side of the dielectric body. The second electrode also includes a linear sloping portion that slopes in a direction toward intersection with the incident direction of the light beam. The linear sloping portion is provided on the light beam outgoing side of the dielectric body. The orthogonal portions, the parallel portions, and the linear sloping portion are formed integrally.

Prior to explaining a light deflecting element according to embodiments; firstly, the explanation is given regarding the relationship between a light deflecting element and an optical spot.

For example, an optical spot is formed by collecting the light of a laser beam. If an optical spot is brought close to the wavelength diffraction limit and is reduced in size, then that optical spot can have a wide array of uses. In order to deflect an optical spot formed by collecting the light of a laser beam; generally, it is necessary to make use of the following: an objective lens that focuses the laser beam; a laser beam that falls on the objective lens; and a light deflecting element that adjusts the angle of incidence of the laser beam with respect to the objective lens.

Thus, by making use of a light deflecting element to adjust the angle of incidence of a laser beam with respect to an objective lens, it becomes possible to change the positions of an optical spot that is formed by the objective lens by collecting the light of a laser beam. Herein, in order to ensure that the optical spot is nearly at the wavelength diffraction limit, it is necessary to make use of an objective lens having a large numerical aperture (na), which is expressed using Equation (1) given below.

$$na = \phi/2\sqrt{\{f^2 + (\Phi^2/4)\}} \tag{1}$$

where f is a focal length of objective lens and $\phi$ is a diameter of the lens.

In that case, it is known that a size d of the optical spot is expressed using Equation (2) given below.

$$d = 2.44\lambda/na \tag{2}$$

where $\lambda$ is a wavelength.

Thus, the greater the numerical aperture (na), the smaller can be the optical spot that is formed. In other words, when the focal length f of the objective lens is constant; then the greater the diameter $\phi$ of the objective lens, the smaller can be the optical spot that is formed.

On the other hand, in order to form an optical spot that has the size expressed using Equation (2), it is necessary that the laser beam that is incident on the objective lens falls on the entire pupil of the objective lens. It is necessary that the diameter of the incident laser beam is equal to or greater than the diameter $\phi$ of the objective lens. From this, it can be noticed that, in order to form a small-sized optical spot, it is necessary to increase the diameter of the incident laser beam.

Meanwhile, if "$\theta$" represents the gradient of the principal ray of the laser beam that is incident on the objective lens (i.e., if "$\theta$" represents the angle of deflection of the laser beam due to a light deflecting element), then a range s that enables focusing of the optical spot (i.e., a scan distance s) is expressed using Equation (3).

$$s = f \tan(\theta) \tag{3}$$

Thus, the greater the angle of deflection $\theta$ and the longer the focal length f, the greater can be the scan distance s that is obtained.

Herein, for the sake of simplicity, the explanation regarding the scan distance s is given with reference to a collimated laser beam. Assume that a laser beam having a diameter $\phi 1$ is deflected by an angle of deflection $\theta$ by a light deflecting element, and is then expanded to have a diameter $\phi 2$ before being collected on an objective lens that has the diameter $\phi 2$ and the focal length f. In that case, the scan distance s is expressed using Equation (4) given below.

$$s = f \cdot \tan(\theta \cdot \phi_1/\phi_2) \quad (4)$$

Particularly, when "$\theta \cdot \phi_1/\phi_2$" is small, the scan distance s is expressed using Equation (5) if paraxial approximation is applied.

$$s = f \cdot \theta \cdot \phi_1/\phi_2 = \theta \cdot \phi_1 \cdot \sqrt{(1-na^2)}/(2 \cdot na) \quad (5)$$

Thus, when the numerical aperture (na) of the objective lens is constant, it can be noticed that the greater the angle of deflection θ of the light deflecting element and the greater the diameter φ1 of the laser beam that is deflected, the better it is for the purpose of increasing the scan distance s of the optical spot.

Explained below is the frequency characteristic of a light deflecting element. At present, as a light deflecting element that adjusts the direction of light, following types are available: a micro electro mechanical systems (MEMS) scanner, a resonant scanner, an electro-optic scanner, and an acousto-optic scanner. However, a MEMS scanner or a resonant scanner is a light deflecting element in which the mirror needs to be mechanically swung in order to adjust the direction of light. Hence, using such a light deflecting element, it is difficult to deflect the light at high speed, and the modulatable frequency is only up to about 1 MHz.

A commonly-used bulk electro-optic element does not have a mechanically-operated portion. Hence, in principle, a bulk electro-optic element can be driven at high speed. However, in practice, in order to deflect light, it is necessary to have a high voltage ranging from a few hundred V to a few kV. At such a high voltage, it is difficult to perform modulation at high speed. Moreover, in order to achieve a high speed at a high voltage, it is necessary to make use of a large-scale power circuit. Thus, generally, the modulatable frequency is limited to about a few MHz.

An acousto-optic scanner deflects light by making use of Bragg reflection by acoustic waves. In this method, depending on conditions such as concentrating the laser beam to 100 μm or less, it becomes possible to perform modulation at about tens of MHz. However, due to the sonic velocity limit, it is difficult to perform deflection control at higher speeds. Moreover, in order to achieve a high speed; in principle, the laser beam needs to be narrowly-concentrated to 100 μm or less. That leads to a decrease in the number of resolvable spots. Besides, the diffraction efficiency goes down thereby resulting in a poor usage efficiency of the light. Hence, achieving higher speeds is a not an easy task.

At present, a waveguide electro-optic deflecting element (a light deflecting element) is known to enable deflection of light at high speed. This element is a type of the electro-optic elements. In a waveguide electro-optic deflecting element, a planar waveguide is formed by forming cladding layers above and below a core, which is made of a material having the electro-optic effect. Thus, the light is guided while being confined inside the core layer. Moreover, in a waveguide electro-optic deflecting element; a ground electrode is formed on the entire lower surface, and prism electrodes are formed on the upper surface of the element.

In a waveguide electro-optic deflecting element, when a voltage is applied between the electrodes, an electric field is impressed on the electro-optic material of the core portion that is sandwiched between the ground electrode and the prism electrodes. As a result, the portion that is sandwiched between the electrodes undergoes variation due to the electro-optic effect. Because of a voltage applied between the electrodes, prism-like regions having a different refractive index get formed in the core portion. For that reason, the waveguide electro-optic deflecting element functions as a light deflecting element that is capable of bending the guided light by means of refraction.

Herein, since the refractive index of an electro-optic material changes in proportion to the electric field impressed on that electro-optic material, a light guiding element can deflect light in proportion to the electric field. Moreover, the shorter the distance between the electrodes, greater can be the angle of deflection that is achieved at a low voltage.

Since a waveguide electro-optic deflecting element has a planar waveguide structure, the distance between the ground electrode and the prism electrodes can be shortened to 10 μm or less. Consequently, the required voltage for light deflection can be reduced to few tens of volts or less. Therefore, the waveguide electro-optic deflecting element becomes able to perform high-speed modulation. Depending on conditions, it also becomes possible to achieve an operation speed of about 1 GHz.

Thus, if a waveguide electro-optic deflecting element can be used to deflect a strong light having the diameter φ, it becomes possible to move a small optical spot at high speed over a wide range.

However, regarding a waveguide electro-optic deflecting element, since the light deflecting element itself has the planar waveguide structure, the laser beam having a Gaussian beam shape cannot be deflected without change. That is, in order to move a small optical spot at high speed over a wide range, the laser beam needs to once fall on the planar waveguide and then a sheet-like laser beam that is emitted upon deflection needs to be shaped into a laser beam having a substantially round cross-sectional surface.

More particularly, the laser beam having a Gaussian beam shape needs to be concentrated using a cylindrical lens to a sheet-like laser beam that is made to fall on a planar waveguide. Then, the sheet-like laser beam that is emitted upon deflection needs to be shaped using a cylindrical lens or an anamorphic lens into a laser beam having a substantially round cross-sectional surface. In that case, the diameter φ of the laser beam can be considered to be equal to a laser width w (i.e., w=φ is satisfied). Thus, for example, in the case when na is equal to 0.85, it is ensured that Equation (6) given below is satisfied in order to achieve the scan distance of ±5 μm.

$$\theta \cdot \phi = s \cdot 2na/\sqrt{(1-na^2)} = 16 \, \mu m \quad (6)$$

Consequently, when the angle of deflection θ of the light deflecting element is 2°, then a required element width w of the light deflecting element is expressed using Equation (7) given below.

$$w = 16/\{(2/180) \times 3.1415\} \approx 458 \, \mu m \quad (7)$$

In this way, in order to move an adequately small optical spot for a considerable distance, it becomes essential for a light deflecting element to deflect a wide laser beam of few hundred μm or more. However, in a typical waveguide electro-optic deflecting element, the electrodes need to be of a larger size in order to be able to deflect a wide laser beam. Hence, it becomes difficult to perform high-speed operations at the same time.

More particularly, the inter-electrode electric capacitance serves as a contributing factor in determining the operating frequency in a waveguide electro-optic deflecting element. Specifically, since a waveguide electro-optic deflecting element has the structure similar to a capacitor, the equivalent circuit thereof is expressed using the electric capacitance of the electrodes and the parasitic resistance that is series-connected. In the case of driving a waveguide electro-optic deflecting element by applying a high frequency, the cutoff frequency ($f_C$) is expressed using Equation (8) given below.

$$f_C = 1/(2\pi CR) \tag{8}$$

Herein, "C" represents an inter-electrode electric capacitance and "R" represents a series resistance component. The inter-electrode electric capacitance C is expressed using Equation (9) given below.

$$C = \in S/d \tag{9}$$

In Equation (9), "∈" represents the inter-electrode electric permittivity, "S" represents the electrode area, and "d" represents the electrode interval. In order to focus the electric field as much as possible on the core layer that is made of an electro-optic material, it is desirable that the cladding layer is a conductive material. If the cladding layer is a conductive material, then the inter-electrode electric permittivity ∈ substantively serves as the electric permittivity of the core layer.

Thus, in a waveguide electro-optic deflecting element; if the electrode area is increased in order to deflect a wide laser beam, then the cutoff frequency grows smaller thereby making it difficult to perform high-speed modulation. Moreover, in a waveguide electro-optic deflecting element; if the electrode interval is shortened, the inter-electrode electric capacitance increases. Consequently, in the end, the cutoff frequency grows smaller.

In the example described above, in the case when na is equal to 0.85, in order to achieve the scan distance of ±5 μm, a laser beam having the width of about 500 μm needs to be deflected by about 2° at a low voltage. In that case, if, for example, $LiNbO_3$ is used as the core material; then a triangular electrode (a prism electrode) having the size of about 500 (μm)×5000 (μm) is required to deflect a laser beam having the width of about 500 μm by about 2°. Then, the cutoff frequency decreases to an extremely small value of about 5 MHz.

First Embodiment

Described below with reference to the accompanying drawings is a first embodiment of a light deflecting element. FIGS. 1A and 1B are diagrams illustrating a general outline of a light deflecting element 1 according to the first embodiment. FIG. 1A is a top view illustrating the general outline of the light deflecting element 1 when viewed from top. FIG. 1B is a side view of the light deflecting element 1 illustrated in FIG. 1A when viewed from the direction of an arrow A.

The light deflecting element 1 has a planar waveguide structure that includes a core 10, which is made of a dielectric body having the electro-optic effect, and includes cladding layers 12, which are formed above and below the core 10. Moreover, a ground electrode 14 is formed on the lower surface of the light deflecting element 1; while a single step-like prism electrode 16 that extends in a diagonal direction of the cladding layers 12 is formed on top of the upper cladding layer 12. With that, the light deflecting element 1 is configured to be a waveguide electro-optic deflecting element.

For the prism electrode 16; a plurality of orthogonal portions, which are substantially orthogonal to the incident direction of a laser beam, and a plurality of parallel portions, which are substantially parallel to the incident direction of the laser beam, are formed in an alternate manner on the incident side of the laser beam. Moreover, for the prism electrode 16; a linear sloping portion, which slopes linearly and forms an angle φ with the incident direction of the laser beam at the intersection, is formed on the laser beam outgoing side. In this way, for the prism electrode 16, the incident side is formed in a step-like manner and the outgoing side is formed so as to slope in one direction.

In the light deflecting element 1, the direction of spontaneous polarization of the core 10 is set in the thickness direction of the planar waveguide structure. More particularly, the core 10 is subjected to polarization treatment in such a way that the entire core 10 uniformly polarizes either upward or downward with respect to the thickness direction. The core 10 is made of, for example, a material containing $LiNbO_3$ and $LiTaO_3$ and having MgO added thereto. Alternatively, the core 10 can also be made of PLZT ($(PbLa)(ZrTi)O_3$).

In the light deflecting element 1, when a voltage is applied between the prism electrode 16 and the ground electrode 14, the region of the core 10 that is sandwiched between the prism electrode 16 and the ground electrode 14 (i.e., a refractive index variation region) undergoes variation in the refractive index due to the electro-optic effect. The variation in the refractive index of the refractive index variation region is expressed using Equation (10) given below.

$$\Delta n = n_0^3 r_{33} V/2d \tag{10}$$

In Equation (10), "Δn" represents the refractive index variation, "$n_0$" represents the refractive index when there is zero electric field on the core 10, "$r_{33}$" represents the electro-optic constant, "V" represents the electrode voltage, and "d" represents the inter-electrode distance.

When a voltage is applied between the prism electrode 16 and the ground electrode 14, not only the refractive index variation region corresponding to the shape of the prism electrode 16 gets formed on the core 10 but also a region having the unchanged refractive index gets formed. As a result, interfaces having different refractive indices are formed on the core 10. Meanwhile, with respect to the core 10, the prism electrode 16 forms interfaces (orthogonal faces) that are substantially orthogonal to the laser beam and interfaces (parallel faces) that are substantially parallel to the laser beam on the incident side. Moreover, with respect to the core 10, the prism electrode 16 forms an interface (refracting face) that slopes in one direction on the outgoing side.

At the interfaces that are formed on the incident side and that are either orthogonal to the laser beam or parallel to the laser beam, the laser beam travels in a straight line without getting refracted. That is because, as long as the laser beam falls perpendicularly with respect to the interfaces having different refractive indices, the laser beam travels in a straight line without getting refracted and does not fall on a parallel interface.

On the other hand, since the interface formed on the outgoing side that slopes at an angle φ relative to the incident direction of the laser beam, the laser beam gets deflected because of refraction. An angle of deflection θ of the laser beam is equal to a value illustrated in Equation (11) given below.

$$\theta = (90-\phi) - \sin^{-1}\{(n_0+\Delta n)/n_0 \cdot \sin(90-\phi)\} \tag{11}$$

where unit of φ is degree.

Figure 2B:
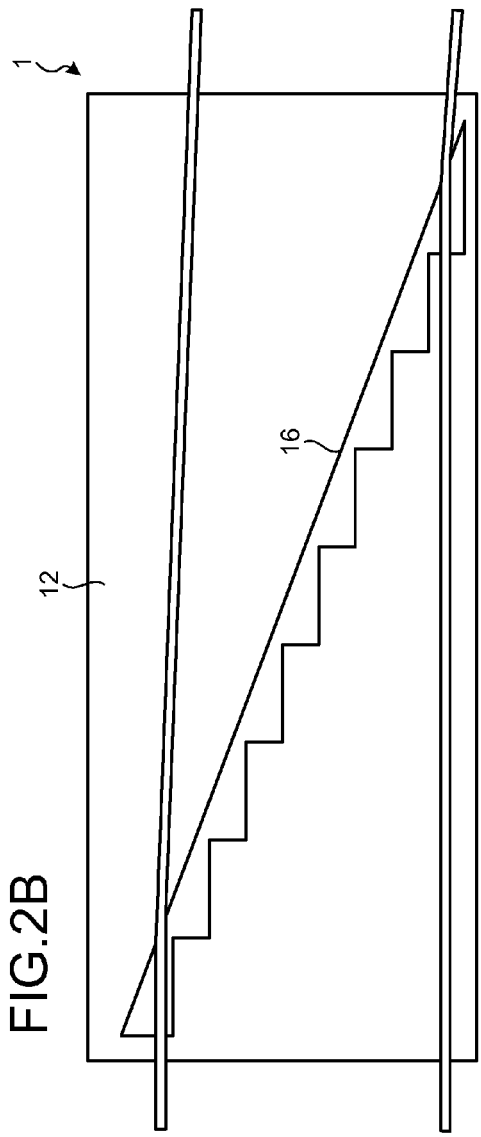

FIGS. 2A and 2B are schematic diagrams that schematically illustrate from above the function of deflecting laser beams that is implemented by the light deflecting element 1 according to the first embodiment. The voltage applied to the prism electrode 16 in FIG. 2A is the inverse voltage of the voltage applied to the prism electrode 16 in FIG. 2B. In FIGS. 2A and 2B, the laser beam that is incident from the left side is deflected in a direction (by the angle of deflection θ) on the outgoing side of the region sandwiched between the prism electrode 16 and the ground electrode 14. Besides, there does not occur any interference of the laser beam.

In this way, with a smaller electrode area as compared to the electrode area of a single electrode in the shape of a large right triangle, the light deflecting element 1 can deflect a wide laser beam having the width w in a substantially uniform manner. For that reason, it becomes possible to move a small optical spot at high speed over a long distance.

As a specific example of the sizes, for example, for the prism electrode 16; the orthogonal portions, which are substantially orthogonal to the incident direction of a laser beam and which have the width of 20, μm and the parallel portions, which are substantially parallel to the incident direction of the laser beam and which have the width of 120 μm, are formed in an alternate manner on the incident side of the laser beam. In addition, for the prism electrode 16; the linear sloping portion, which slopes linearly and forms an angle of 9.46° with the incident direction of the laser beam at the intersection, is formed on the laser beam outgoing side.

For the prism electrode 16, it is assumed that 30 orthogonal portions are formed and that the laser beam having the width of 500 μm can be deflected. In that case, for example, if a voltage of 50 V is applied to the prism electrode 16, then a laser beam that has the width of 500 μm and that falls on the light deflecting element 1 is deflected by 1.4°. If that laser beam is collected in an optical spot with the use of a lens having the numerical aperture (na) equal to 0.85, it becomes possible to achieve a scan amount having the width of ±3.8 μm. Meanwhile, with the prism electrode 16 and the ground electrode 14; the capacitance is 7 pF and the cutoff frequency is 325 MHz.

As another specific example of the sizes, for example, for the prism electrode 16; the orthogonal portions, which are substantially orthogonal to the incident direction of a laser beam and which have the width of 20 μm, and the parallel portions, which are substantially parallel to the incident direction of the laser beam and which have the width of 60 μm, are formed in an alternate manner on the incident side of the laser beam. In addition, for the prism electrode 16; the linear sloping portion, which slopes in the direction that intersects with the incident direction of the laser beam by 9.46°, is formed on the laser beam outgoing side.

For the prism electrode 16, it is assumed that 40 orthogonal portions are formed and that the laser beam having the width of 300 μm can be deflected. In that case, for example, if a voltage of 50 V is applied to the prism electrode 16, then a laser beam that has the width of 300 μm and that falls on the light deflecting element 1 is deflected by 0.7°. If that laser beam is collected in an optical spot with the use of a lens having the numerical aperture (na) equal to 0.85, it becomes possible to achieve a scan amount having the width of ±1.1 μm. Meanwhile, with the prism electrode 16 and the ground electrode 14; the capacitance is 2.3 pF and the cutoff frequency is 972 MHz. Thus, with the scan amount of ±1.1 μm, the light deflecting element 1 can deflect a laser beam at a frequency of nearly 1 GHz.

First Comparison Example

FIG. 3 is a configuration diagram illustrating a general outline of a light deflecting element according to a first comparison example with respect to the light deflecting element 1. In the light deflecting element according to the first comparison example illustrated in FIG. 3, the constituent elements that are substantively identical to the constituent elements in the light deflecting element 1 illustrated in FIGS. 1A and 1B are referred to by the same reference numerals. As illustrated in FIG. 3, in the light deflecting element according to the first comparison example, a plurality of electrodes of a single type, such as prism electrodes 18, are arranged on the upper surface. Thus, in the first comparison example, the electrodes formed in the shape of right triangles have the oblique sides that slope in only one direction.

FIGS. 4A and 4B are schematic diagrams that schematically illustrate from above the function of deflecting laser beams that is implemented by the light deflecting element according to the first comparison example illustrated in FIG. 3. The voltage applied to the prism electrodes 18 in FIG. 4A is the inverse voltage of the voltage applied to the prism electrodes 18 in FIG. 4B. As illustrated in FIG. 4A, in the light deflecting element according to the first comparison example, the laser beam that has been deflected at the refractive index variation region formed by a single prism electrode 18 falls on the refractive index variation region formed by another prism electrode 18. As illustrated in FIG. 4B, in the light deflecting element according to the first comparison example, depending on the direction of deflection of a laser beam, a dark portion (shade) gets formed in the deflected laser beam. Thus, in the light deflecting element according to the first comparison example, a uniform deflected state of the laser beam cannot be achieved in entirety. Hence, it is difficult to focus the laser beam to an optical spot size close to the diffraction limit.

Second Comparison Example

In a second comparison example, it is assumed that prism electrodes formed in the shape of right triangles have the oblique sides that slopes in only one direction in an identical manner to the first comparison example illustrated in FIG. 3. However, in the second comparison example, it is assumed that only a single electrode in the shape of a right triangle (not illustrated) deflects the incident laser beam. More particularly, a single prism electrode 18 is disposed that is in the shape of a right triangle having the short side of 600 μm, the long side of 3600 μm, and the acute angle φ of 9.46°, and a laser beam having the width of 500 μm can be deflected. In the second comparison example, for example, if a voltage of 50 V is applied to that prism electrode 18, then an incident laser beam having the width of 500 μm is deflected by 1.4°. If that laser beam is collected in an optical spot with the use of a lens having the numerical aperture (na) equal to 0.85, it becomes possible to achieve a scan amount having the width of ±3.8 μm. However, due to the prism electrode 18 and the ground electrode 14, the capacitance increases to a large amount of 210 pF and the cutoff frequency becomes 10.8 MHz. Hence, as compared to the light deflecting element 1 according to the first embodiment, there occurs a delay by a single digit to close to two digits.

Second Embodiment

FIGS. 5A and 5B are diagrams illustrating a general outline of a light deflecting element 2 according to a second embodiment. FIG. 5A is a top view illustrating the general outline of the light deflecting element 2 when viewed from top. FIG. 5B is a side view of the light deflecting element 2 illustrated in FIG. 5A when viewed from the direction of the arrow A. Meanwhile, in the light deflecting element 2 illustrated in FIGS. 5A and 5B, the constituent elements that are substantively identical to the constituent elements in the light deflecting element 1 illustrated in FIGS. 1A and 1B are referred to by the same reference numerals.

In an identical manner to the light deflecting element 1, the light deflecting element 2 has the basic structure of a waveguide electro-optic deflecting element. The direction of intrinsic polarization of the core 10 is set in the thickness direction of the planar waveguide structure.

The light deflecting element 2 is manufactured by attaching a stainless substrate 20, which has a small difference in coefficient of thermal expansion, to an LiNbO$_3$:MgO monocrystalline substrate, which forms the core 10, and then by performing grinding until a small thickness of 2 μm is achieved. Meanwhile, the light deflecting element 2 does not have the cladding layers 12 that are illustrated in FIGS. 1A and 1B and has a single-slab waveguide structure of LiNbO$_3$:MgO. Moreover, in the light deflecting element 2, the stainless substrate 20 serves as a ground electrode.

Once the light deflecting element 2 is grinded to the thickness of 2 μm, a prism electrode 22 is formed on the upper surface of the core 10 by means of the liftoff technique. The prism electrode 22 is a step-like prism electrode identical to the prism electrode 16 illustrated in FIGS. 1A and 1B.

In the prism electrode 22; the orthogonal portions, which are substantially orthogonal to the incident direction of a laser beam and which have the width of 50 μm, and the parallel portions, which are substantially parallel to the incident direction of the laser beam and which have the width of 300 μm, are formed in an alternate manner on the incident side of the laser beam. In addition, in the prism electrode 22; the linear sloping portion, which slopes linearly and forms an angle of 9.46° with the incident direction of the laser beam at the inter section, is formed on the laser beam outgoing side.

In the prism electrode 22, it is assumed that 12 orthogonal portions are formed and that the laser beam having the width of 500 μm can be deflected. Meanwhile, the prism electrode 22 has, for example, a two-layered structure containing Chromium (Cr) of 10 nm and gold (Au) of 50 nm.

For example, if a voltage of 50 V is applied to the prism electrode 22, then a laser beam that has the width of 500 μm and that falls on the light deflecting element 2 is deflected by 1.4°. Herein, with the prism electrode 22 and the ground electrode 14; the capacitance is 17.5 pF and the cutoff frequency is 130 MHz.

Explained below are configuration examples for moving an optical spot (for performing scanning) with the use of the light deflecting element 1 (or the light deflecting element 2).

Figure 6:
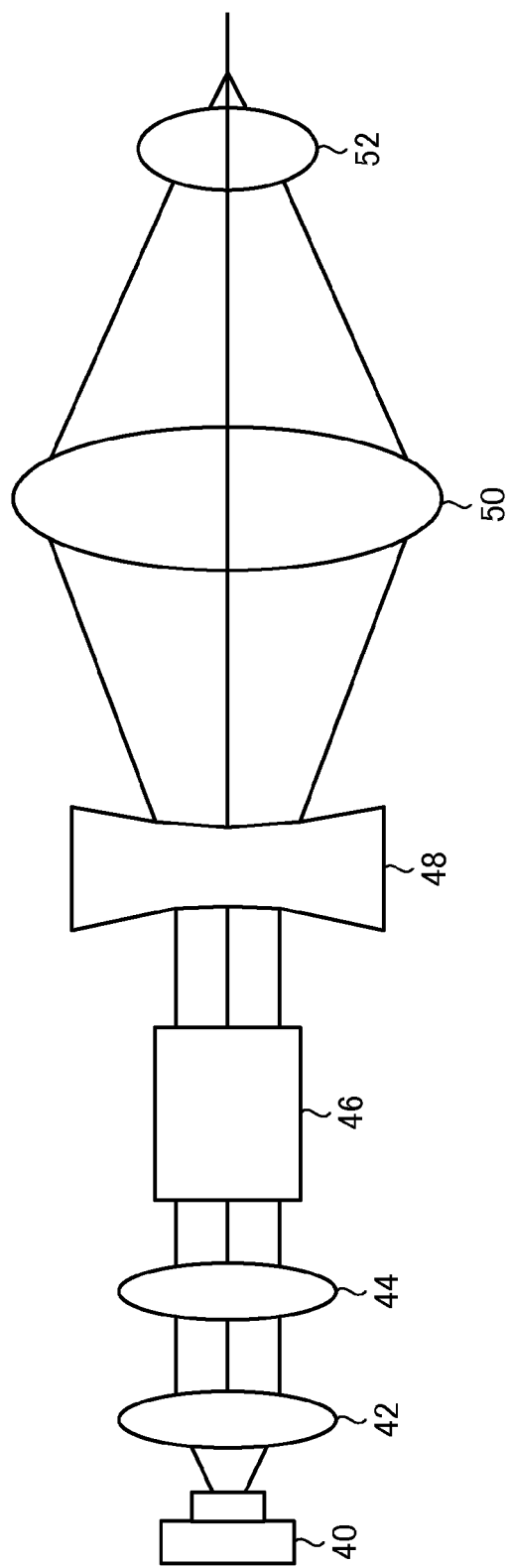
FIG. 6 is a diagram illustrating a first configuration example for moving an optical spot.

FIG. 6 is a diagram illustrating a first configuration example for moving an optical spot. As illustrated in FIG. 6, for example, a laser beam emitted by a blue laser diode (LD) 40 is collimated by an anamorphic lens 42 into a beam having the diameter of 500 μm. Then, the collimated laser beam gets concentrated by a cylindrical lens 44 before falling on a deflector 46.

The deflector 46 includes the light deflecting element 1 (or the light deflecting element 2), and emits a laser beam upon deflecting it according to the voltage applied from a power supply unit (not illustrated). The laser beam emitted by the deflector 46 is sheet-like in shape and diverges in the perpendicular direction with respect to the planar waveguide of the light deflecting element 1. An anamorphic lens 48 shapes the laser beam, which has been emitted by the deflector 46, in such a way that the laser beam has a substantially round cross-sectional surface. The laser beam shaped by the anamorphic lens 48 passes through a collimator lens 50 and falls on an objective lens 52 having the numerical aperture (na) of 0.85. Then, the objective lens 52 forms an optical spot on a focal plane.

For example, with the drive voltage of 50 V, a laser beam collimated to have the diameter of 500 μm can be deflected by the deflector 46, which includes the light deflecting element 1, by 1.4°. Hence, on the focal plane, a scan distance of ±3.8 μm is achieved.

Figure 7:
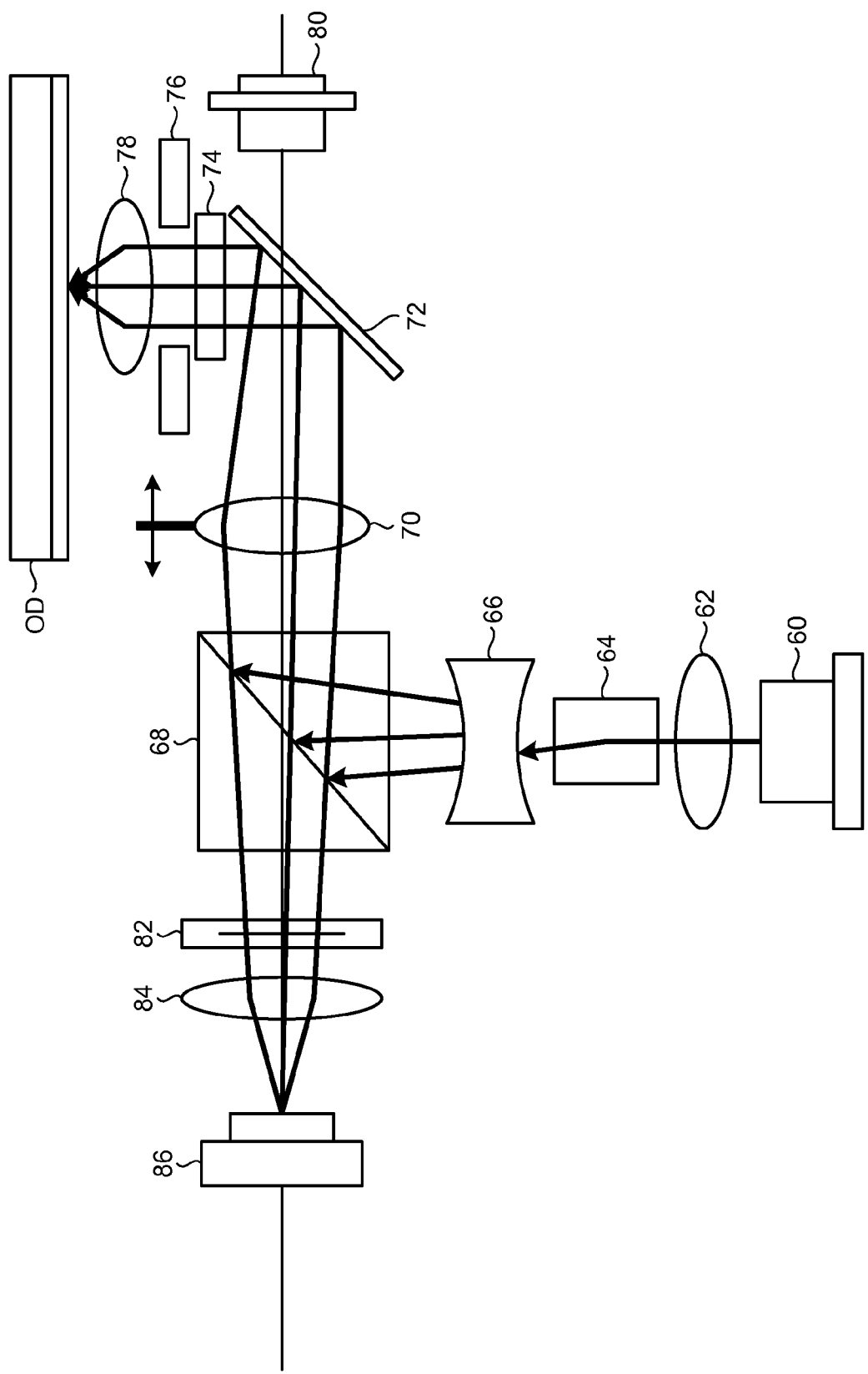
FIG. 7 is a configuration diagram illustrating a second configuration example for moving an optical spot.

FIG. 7 is a configuration diagram illustrating a general outline of an optical disk device (an optical disk drive) as a second configuration example for moving an optical spot. The optical disk device performs data writing and data reading with respect to the tracks of an optical disk such as a Blu-ray Disc (BD) that is rotated by a rotating mechanism such as a spindle motor (not illustrated).

The optical disk device includes an LD 60, a coupling lens 62, a deflector 64, a concave lens 66, a beam splitter 68, a collimator 70, a standing mirror 72, a hologram lens 74, an aperture 76, an objective lens 78, a light intensity monitor 80, a hologram filter 82, a collecting lens 84, and a photodiode array 86.

The LD 60 is, for example, a blue laser diode that generates a laser beam and emits it to the coupling lens 62. Herein, the coupling lens 62 is, for example, a cylindrical lens that concentrates the laser beam, which has been emitted by the LD 60, into a sheet-like light (linear light) and guides it to the deflector 64.

The deflector 64 includes the light deflecting element 1 (the light deflecting element 2), and deflects the laser beam according to a voltage applied by a power supply unit (not illustrated). The concave lens 66 shapes the laser beam, which is emitted by the deflector 64, in such a way that the laser beam has a substantially round cross-sectional surface; and then guides the shaped light to the beam splitter 68.

The beam splitter 68 reflects a portion of the laser beam, which is guided from the concave lens 66, toward the collimator 70. Moreover, the beam splitter 68 isolates the laser beam that is emitted by the LD 60 from the laser beam that is reflected from the optical disk. The collimator 70 collimates the laser beam, which is received from the beam splitter 68, into a parallel beam of light.

The standing mirror 72 reflects the laser beam, which has passed through the collimator 70, toward the optical disk (OD). The hologram lens 74 isolates the laser beam that is emitted by the LD 60 from the laser beam that is reflected from the optical disk. The aperture 76 is set so as to concentrate the laser beam. The objective lens 78 focuses the laser beam on a track of the optical disk, and forms an optical spot to be used in data writing and data reading. The light intensity monitor 80 monitors the light intensity of the laser beam.

The laser beam reflected from the optical disk gets reflected from the standing mirror 72 and is guided to the hologram filter 82 through the collimator 70 and the beam splitter 68. The hologram filter 82 shapes the laser beam reflected from the optical disk and guides that laser beam to the collecting lens 84. Then, the collecting lens 84 focuses the laser beam, which is incident from the hologram filter 82, on the photodiode array 86. Subsequently, the laser beam received by the photodiode array 86 is converted into electric signals that are used in controlling the deflector 64.

In the optical disk device illustrated in FIG. 7, the objective lens 78 is set to have the numerical aperture (na) of 0.85, which is identical to the objective lens 52 illustrated in FIG. 6. Moreover, on the optical disk, scanning of ±3.8 μm can be performed. Hence, regarding recording tracks that are recorded at a pitch of 0.3 μm, it becomes possible to read 25 tracks during a single scan.

Thus, while keeping the optical disk rotated at a rate at which 72 Mbps, which is equivalent to twice the rate of a Blu-ray Disc, can be achieved from a single track; the optical disk device that includes the light deflecting element 1 can scan 25 tracks and read them in parallel. As a result, a reading rate of 1.8 Gbps can be achieved.

Meanwhile, in the light deflecting element 1 (the light deflecting element 2), due to manufacturing reasons or depending on the settings, it is also possible to allow a case in which the orthogonal portions of the prism electrode 16 (or the prism electrode 22) are not completely orthogonal but slightly non-orthogonal with respect to the incident direction of the laser beam. Similarly, it is also possible to allow a case in which the parallel portions of the prism electrode 16 (or the prism electrode 22) are not completely parallel but slightly non-parallel with respect to the incident direction of the laser beam.

According to an aspect of the embodiment, with a smaller electrode area as compared to the electrode area of a single electrode in the shape of a large right triangle, it becomes possible to deflect a wide laser beam without causing any interference for the laser beam. For that reason, it becomes possible to deflect a small optical spot at high speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light deflecting element comprising:
    a dielectric body having a first surface and a second surface facing each other, the dielectric body having an electro-optic effect;
    a first electrode disposed on the first surface; and
    a second electrode configured to sandwich the dielectric body with the first electrode so as to apply a voltage to the dielectric body, the second electrode being disposed on the second surface, wherein
    the second electrode includes
        a plurality of orthogonal portions that are substantially orthogonal to an incident direction of a light beam passing through the dielectric body,
        a plurality of parallel portions that are substantially parallel to the incident direction of the light beam, the orthogonal portions and the parallel portions being formed in a step-like, alternate manner on a light beam incident side of the dielectric body, and
        a linear sloping portion that slopes in one direction toward intersection with the incident direction of the light beam, the linear sloping portion being provided on a light bears outgoing side of the dielectric body, and
    the orthogonal portions, the parallel portions, and the linear sloping portion are formed integrally.

2. The element according to claim 1, wherein
    the dielectric body has a first region that is not sandwiched between the second electrode and the first electrode, and a second region is sandwiched between the second electrode and the first electrode,
    the second region has a refractive index different from a refractive index of the first region when a voltage is applied across the second electrode and the first electrode,
    the second region has
        a plurality of orthogonal faces that are substantially orthogonal to the incident direction of the light beam,
        a plurality of parallel faces that are substantially parallel to the incident direction of the light beam, the orthogonal faces and the parallel faces being formed in a step-like, alternate manner on the light beam incident side, and
        one refracting face that refracts the light beam, the refracting face sloping in one direction and being formed on the light beam outgoing side, and
    the second region is enclosed by the plurality of orthogonal faces, the plurality of parallel faces, and the refracting face.

3. The element according to claim 1, wherein the dielectric body is a waveguide that allows light of a predetermined width to pass therethrough.

4. The element according to claim 1, wherein the dielectric body is a material selected from the group containing $LiNbO_3$, $LiTaO_3$, $LiNbO_3$ having MgO added thereto, $LiTaO_3$ MgO added thereto, and PLZT ($(PbLa)(ZrTi)O_3$).

* * * * *